Figure 1:
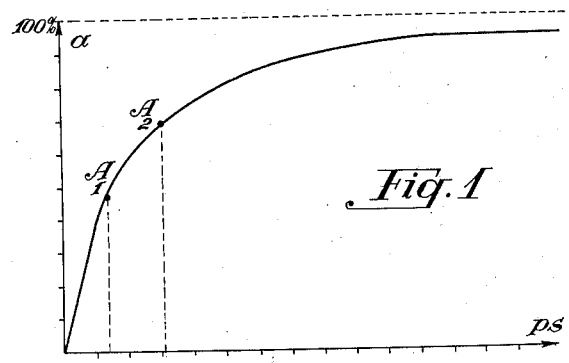

Nov. 13, 1928.

H. SCHMICK 1,691,138

DETERMINING THE CONTENTS OF A GAS

Filed June 3, 1926

Inventor
Hans Schmick
by Lotka, Kehlenbeck & Farley
Attorneys.

Patented Nov. 13, 1928.

1,691,138

UNITED STATES PATENT OFFICE.

HANS SCHMICK, OF BERLIN-CHARLOTTENBURG, GERMANY, ASSIGNOR TO SIEMENS & HALSKE, AKTIENGESELLSCHAFT, OF SIEMENSSTADT, GERMANY, A GERMAN CORPORATION.

DETERMINING THE CONTENTS OF A GAS.

Application filed June 3, 1926, Serial No. 113,434, and in Germany June 4, 1925.

My invention relates to a method of and apparatus for determining the contents of a gas, and particularly the amount of carbon dioxide present therein.

A well-known way of determining the carbon dioxide content of a gas consists in measuring its capacity for absorbing heat rays. Since when using a source of heat rays of the continuous spectrum character only a small proportion of these rays will be absorbed, it has already been attempted to improve the ratio which the rays absorbed bear to the total radiation, by interposing absorbing means in the path of the rays and thus confining the active range of the waves of the source of radiation to a smaller field which includes a zone of rays of such a wave length as will be absorbed readily by carbon dioxide.

Instead of first employing a source of heat rays of the continuous spectrum character and then eliminating the undesirable portion of such rays, I have achieved a valuable improvement by employing from the start a selective radiator which emits only those rays which are especially suitable for the particular measurement intended. In the ideal case the gas the partial pressure of which is to be determined is itself thus to be used in the incandescent state as a source of heat radiation. The presence of other gases mixed with the gas to be determined, has a disturbing effect in so far as the absorption bands of these gases overlap those of the gas to be determined, yet, as these absorption bands are not continuous, there results a reduction of the aggregate width of those portions or wave length zones within which absorption by two or more gases occurs. Furthermore, since those points where the emission of the gas to be determined is strongest will even in the event of overlapping such as referred to above hardly ever coincide with points at which there is a strong emission of some other gas it will be understood readily that superior results are obtained by employing as a source of radiation, the same gas, in an incandescent state, as the gas to be determined.

According to a further feature of my invention, results may be obtained in a very simple manner by using a flame as the source of radiation, particularly in the case of carbon dioxide. The ordinary Bunsen flame is quite suitable, since, for instance, in the intermediate layer, which in the Méker burner forms the largest part of the flame, it contains 5% of carbon dioxide, 12% of steam, 9% of carbon monoxide, 14% of hydrogen and 1% of oxygen. Although in such a flame the gas to be determined, the carbon dioxide, forms only a smaller proportion than the other gases, the action of such other gases can be neglected as regards their effect on the radiation. This is due to a peculiarity of the carbon dioxide radiation, viz, the extraordinarily high emission and absorption capacity of carbon dioxide at about 4, 3$\mu$. Owing to this high emission capacity waves of the particular length just mentioned are emitted and absorbed by a comparatively thin layer with almost the same intensity as by an infinitely thick layer. 100% carbon dioxide would do this even with a layer of a thickness of only 1 to 2 millimetres, and therefore 10% carbon dioxide would produce the same effect with a layer of a thickness of 1 to 2 millimetres. Corresponding, although weaker, is the action with carbon dioxide in the entire range of the absorption band while with other gases a layer about 10 times thicker is required to bring about the same absorption. The absorption of other gases is therefore very much less than that of carbon dioxide. When using the Bunsen flame, for instance in the form of a slit burner or Méker burner, as source of radiations, the influence of the other gases on the results of the measurements can be neglected in many cases. In order that the carbon dioxide radiation may sufficiently preponderate over the radiation of the admixed gases, the thickness of layer of the source of radiation is preferably dimensioned in accordance with the density of the carbon dioxide in the radiating gas mixture. The method according to my invention is, for instance, particularly suitable for determining the carbon dioxide content of producer gas.

Figure 2:
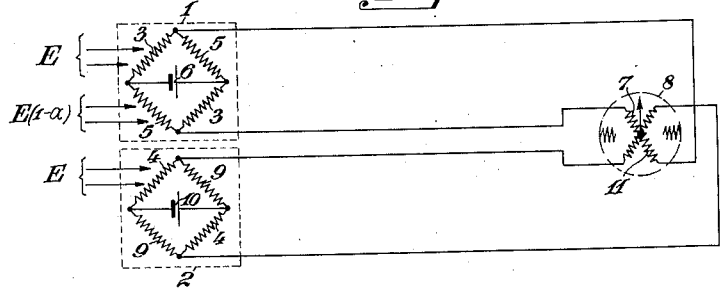
Figure 2A:
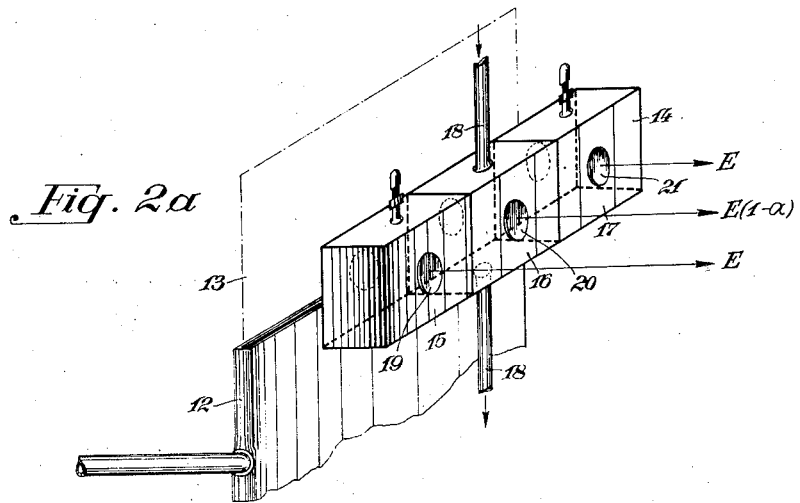

I will now proceed to describe my invention with reference to the accompanying drawings, in which Fig. 1 is a curve diagram or graph for explaining my method; Fig. 2 is a diagram of an apparatus for carrying out my improved method, and Fig. 2$^a$ is a perspective view illustrating a device for producing a radiation such as may be utilized according to Fig. 2.

The most suitable thickness of the gas mixture to be examined may be determined easily in the following manner:

Fig. 1 of the drawing shows qualitatively the relation between the absorption, the percentage value $a$ of which is plotted as an ordinate, while the abscissa represents the product of the thickness of layer $s$ of the test gas and the partial pressure $p$ of the gas to be measured. Such a curve may be predetermined for a given source of radiation if the temperatures and thickness of layers do not fluctuate excessively. The magnitude of the partial pressure $p$ will generally be known with a rough approximation. The thickness $s$ of the layer should then be so chosen that within the measuring range of $p$ there will be that portion of the curve which has a mean gradient, in the diagram approximately the portion between the points $A_1$ and $A_2$. The thickness $s$ best adapted for each particular case is determined experimentally by first plotting for a number of different assumed thicknesses, curves of the character of the one shown in Fig. 1, and then selecting the particular thickness $s$ for which the portion $A_1$, $A_2$ of the curve lies between those ordinates which correspond to the carbon dioxide proportions to be determined by the test.

For obtaining a strong radiation, the absorption loss of which may be measured with industrial apparatus, a flame is particularly suitable as a source of high temperature radiation. Disturbing factors to be taken into consideration, are constituted by fluctuations of the flame and, since the determination of the absorption must take place by way of a temperature measurement, also the fluctuations of the ambient temperature. The measurement should give the ordinate $a$ of Fig. 1 from which may be deduced the value of the corresponding abscissa and thus, if the layer thickness $s$ be known, the value of the partial pressure $p$ to be ascertained. The value $a$ is determined by two measurements, viz, the measurement of the absorbed radiation and the measurement of the total radiation. The ratio of the two radiations gives the value $a$. The fluctuations in the composition of the flame gases cancel out in the figuring of this ratio. The measurement of each of the radiations mentioned above is effected by comparing the resistance of a bolometer exposed to a certain radiation with the resistance of a bolometer exposed to a weaker radiation or to none at all. In computing the difference of these resistances the measurement of the radiation becomes independent of the fluctuations of the ambient temperature, if equal bolometer resistances are used.

Fig. 2 shows the wiring connections diagrammatically in one embodiment. Two bridge arrangements 1 and 2 contain two pairs of associated bolometer resistances 3, 3 and 4, 4 which are exposed to the total radiation E, without absorption.

Fig. 2ª shows, as an example, a device such as may be used for producing the rays or radiation E and the radiation E $(1-a)$ remaining after such rays have passed through the gas to be tested. A slit burner 12, supplied with a gaseous mixture containing hydrocarbons, produces the flame 13 containing carbon dioxide. The radiation emitted by the flame 13 passes through three separate chambers 15, 16, 17 provided in a block or casing 14. The chambers 15 and 17, which preferably are closed, contain a gas, for instance air, used as a standard of comparison, while the chamber 16 serves for the passage of the gas to be tested for carbon dioxide, such gas flowing to and from said chamber through pipes 18 and 18′ respectively. Each of the chambers 15, 16, 17 is provided with windows 19, 20, and 21 respectively, both on the sidefacing the flame 13, and on the opposite side, such windows allowing the radiation to pass through. The rays or radiations issuing from these chambers are designated in Fig. 2ª by E and E $(1-a)$ respectively, corresponding to the like designations in Fig. 2. The bridge 1 contains furthermore a second pair of bolometer resistances 5 which are similar to the first. They are exposed to the radiation which has passed through the test gas and thus possesses the strength E $(-a)$. The source of current for the bridge 1 is indicated at 6. Instead of a galvanometer, I use the coil 7 of a proportional ammeter 8. The resistances are so balanced that in the absence of radiation the current of the coil 7 is zero. With the small temperature increases to which the bolometer resistances are subjected, the current in the coil 7 is proportional to the difference $E-E(1-a)=Ea$ of the radiations striking the pairs of resistances. In the second bridge 2 there are provided besides the bolometer resistances 4 exposed to the radiation, two resistances 9 serving as checks or standards of comparison. The source of current is indicated at 10. Instead of the galvanometer, I employ the second coil 11 of the ratio meter 8 which coil is co-ordinated to the coil 7. The current in the coil 11 is proportional to the radiation to which the resistances 4 are exposed. The disturbing effects of fluctuations of the external temperature are eliminated by the use of the bridge 2, if this bridge, in the well known manner, is so adjusted that in the absence of the radiation the current of the coil 11 is equal to zero. The ratio of the currents in the coils 7 and 11 to the producing radiation values is adjusted for the same value, so that the ratio of the currents in the coils 7 and 11 to each other represents the ratio between the radiation difference $Ea$ at the first bridge, that is the absorbed radiation, and the radiation E at the second bridge, that is the total radiation. The value indicated by the ratio meter is $$\frac{E \cdot a}{E} = a.$$

The radiation of the resistances 3 may also be eliminated and the ratio meter then indicates the value $$\frac{E(1-a)}{E} = 1-a,$$

the scale then being naturally calibrated in $a$.

The bolometric measurement of the radiation is the most obvious method. If desired, however, other methods may be used for measuring the radiation.

Various modifications and changes may be made without departing from the spirit and the scope of the invention, and I desire, therefore, that only such limitations shall be placed thereon as are imposed by the prior art.

What I claim as my invention and desire to secure by Letters Patent is:—

1. In a method for determining a gas by radiation measurement, the use of a selective radiator the emission bands of which overlap as little as possible the absorption bands of the test gas.

2. In a method for determining a gas by radiation measurement, the use of an incandescent gas quantity as source of radiation, said quantity containing the test gas.

3. In a method of determining a gas by radiation measurement, the use of a luminous flame containing the test gas as source of radiation.

4. In a method of determining a gas by radiation measurement, the use of a ray emitting gas quantity containing the test gas as source of radiation and the selection of such a thickness of layer, that the emission is preponderatingly produced by the constituent of the said gas which corresponds with the test gas.

5. In a method for determining a gas by radiation measurement, the use of a ray emitting gas quantity containing the test gas as source of radiation and choosing the thickness of the absorbing layer in proportion to the partial pressure of the test gas so that the absorption changes to a considerable extent together with the partial pressure.

6. In a method of determining a gas by radiation measurement, the use of a source of radiation which contains the test gas and determining the absorbed gas quantity by the ratio between the total radiation and the penetrated radiation in order to eliminate the influence of radiation fluctuations of the source of radiation.

7. In a method for determining carbon dioxide in a mixture of gases, the use as selective radiator of a ray emitting gas quantity which contains the carbon dioxide mixed with other gases.

8. In a method for determining carbon dioxide in a mixture of gases, the use as selective radiator of a ray emitting gas quantity which contains carbon dioxide mixed with steam, carbon monoxide, hydrogen and oxygen.

9. An apparatus for determining the $CO_2$ content of gaseous mixtures, comprising means for producing a flame containing $CO_2$, means for presenting within the field of radiation of said flame, the gas to be tested as to its $CO_2$ content, and an electric device, responsive to radiation and located in the path of rays which proceed from said flame and have passed through said gas.

10. An apparatus for determining the $CO_2$ content of gaseous mixtures, comprising means for producing a flame containing $CO_2$, means for presenting within the field of radiation of said flame, the gas to be tested as to its $CO_2$ content, and another gas serving as a standard of comparison, and an electric device, responsive to radiation and located in the path of the rays which have passed from said flame through said layer of standard gas and also in the path of the rays which have passed from said flame through the gas to be tested.

In testimony whereof I affix my signature.

HANS SCHMICK.